United States Patent
Uruma (10) Patent No.: US 11,797,244 B2
(45) Date of Patent: Oct. 24, 2023

(54) IMAGE PROCESSING APPARATUS THAT CONTROLS DISPLAY OF OBJECT, METHOD OF CONTROLLING THE SAME, AND STORAGE MEDIUM

(71) Applicant: CANON KABUSHIKI KAISHA, Tokyo (JP)

(72) Inventor: Kazuhiro Uruma, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/690,522

(22) Filed: Mar. 9, 2022

(65) Prior Publication Data

US 2022/0291883 A1    Sep. 15, 2022

(30) Foreign Application Priority Data

Mar. 15, 2021   (JP) ................................ 2021-041558

(51) Int. Cl.
*G06F 3/12* (2006.01)
*G06F 3/04842* (2022.01)

(52) U.S. Cl.
CPC ........ *G06F 3/1253* (2013.01); *G06F 3/04842* (2013.01); *G06F 3/1204* (2013.01); *G06F 3/1205* (2013.01); *G06F 3/1273* (2013.01)

(58) Field of Classification Search
CPC .. G06F 3/1253; G06F 3/04842; G06F 3/1204; G06F 3/1205; G06F 3/1273
See application file for complete search history.

(56) References Cited

U.S. PATENT DOCUMENTS

| 4,660,146 | A | * | 4/1987 | Kubo | .................. B60T 8/17616 |
| | | | | | 700/304 |
| 9,736,223 | B2 | | 8/2017 | Akimoto | |
| 2016/0370990 | A1 | * | 12/2016 | Sharaf | .................. G06F 3/04886 |
| 2017/0132037 | A1 | * | 5/2017 | Sevigny | ................. G06F 9/4881 |
| 2017/0328625 | A1 | * | 11/2017 | Fujimoto | ............. F25D 11/003 |
| 2019/0317702 | A1 | * | 10/2019 | Kaneda | .................... G06F 3/122 |
| 2021/0149766 | A1 | * | 5/2021 | Arumugam | ........... G06F 9/4881 |
| 2021/0203798 | A1 | * | 7/2021 | Ito | ...................... H04N 1/00411 |

FOREIGN PATENT DOCUMENTS

| JP | 2011234170 | A | | 11/2011 |
| JP | 2013145946 | A | | 7/2013 |
| JP | 2015254971 | | * | 6/2017 |
| JP | 2017118456 | | * | 6/2017 |

* cited by examiner

*Primary Examiner* — Helen Zong
(74) *Attorney, Agent, or Firm* — ROSSI, KIMMS & McDOWELL LLP (57) ABSTRACT

An image processing apparatus capable of preventing display priority of an application button displayed on a home screen from being raised to a higher rank due to repeat of error termination. A plurality of application buttons each for executing a predetermined job with settings therefor are displayed on the home screen. A user interface selects one object of the plurality of objects. After the one object is selected by the user interface, the one job is executed based on settings set in association therewith. When execution of the job is not normally completed, the controller does not increase the number of times of use of the object selected by the user interface according to which the display priority of the object is raised.

5 Claims, 6 Drawing Sheets

| ERROR CODE | SUMMARY | DETAILS | RETRANSMISSION RESULT PREDICTION |
|---|---|---|---|
| #001 | ORIGINAL JAM | Original is jammed. | ○ |
| #018 | REDIALING NG | Transmission failed because of busy line. The called party is on another call or performing communication. | △ |
| #022 | TELEPHONE NUMBER ABNORMALITY | Telephone number information cannot be acquired when transmitting fax. | × |
| #080 | ADDRESS-DESIGNATED TRANSMISSION NG | DIS command BIT 49 (sub address capability) on receiving side is OFF. | × |
| #099 | STOP KEY PRESSED | Job is canceled by user. | ○ |
| #102 | ADDRESS-DESIGNATED TRANSMISSION NG | F code and password do not match. | × |
| #995 | JOB IN QUEUE STOPPED | Job is canceled when in queue before transmission. | ○ |

| No | GENERATION DATE | JOB TYPE | SETTINGS | ERROR CODE |
|---|---|---|---|---|
| 001 | 2020/11/20 11:00 | COPY | NUMBER OF SETS:1, COLOR SELECTION: COLOR, DOUBLE/SINGLE-SIDED SETTING: SINGLE-SIDED, SHEET: AUTO, MAGNIFICATION:100%, FINISH: NONE | |
| 002 | 2020/11/20 10:00 | COPY | NUMBER OF SETS:1, COLOR SELECTION: COLOR, DOUBLE/SINGLE-SIDED SETTING: SINGLE-SIDED, SHEET: AUTO, MAGNIFICATION:100%, FINISH: NONE | |
| 003 | 2020/11/14 10:00 | FAX | DESTINATION:0441112345, READING SIZE: AUTO, RESOLUTION 200*100, MAGNIFICATION:100 | |
| 004 | 2020/11/13 17:00 | FAX | DESTINATION:0441112277, READING SIZE: AUTO, RESOLUTION 200*200, MAGNIFICATION:100 | |
| 005 | 2020/11/13 15:00 | COPY | NUMBER OF SETS:1, COLOR SELECTION: COLOR, DOUBLE/SINGLE-SIDED SETTING: DOUBLE-SIDED, SHEET: AUTO, MAGNIFICATION:100%, FINISH: NONE | |
| 006 | 2020/11/13 14:00 | FAX | DESTINATION:0441112345, READING SIZE: AUTO, RESOLUTION 200*100, MAGNIFICATION:100% | |
| 007 | 2020/11/13 13:00 | COPY | NUMBER OF SETS:1, COLOR SELECTION: MONOCHROME, DOUBLE/SINGLE-SIDED SETTING: SINGLE-SIDED, SHEET: AUTO, MAGNIFICATION:100%, FINISH: NONE | |
| 008 | 2020/11/13 10:00 | FAX | DESTINATION:0441112233, READING SIZE: AUTO, RESOLUTION 200*200, MAGNIFICATION:100 | #018 |
| 009 | 2020/11/12 16:00 | FAX | DESTINATION:0441112266, READING SIZE: AUTO, RESOLUTION 200*200, MAGNIFICATION:100 | |
| 010 | 2020/11/12 15:00 | Email | DESTINATION:tanaka@canon.co.jp, READING SIZE: AUTO, RESOLUTION 300*300, MAGNIFICATION:100% | |
| 011 | 2020/11/12 13:00 | FAX | DESTINATION:0441112255, READING SIZE: AUTO, RESOLUTION 200*200, MAGNIFICATION:100 | |
| 012 | 2020/11/12 10:00 | FAX | DESTINATION:0441112345, READING SIZE: AUTO, RESOLUTION 200*100, MAGNIFICATION:100 | |
| ... | ... | ... | ... | |
| 1000 | 2020/10/9 11:00 | COPY | NUMBER OF SETS:1, COLOR SELECTION: MONOCHROME, DOUBLE/SINGLE-SIDED SETTING: SINGLE-SIDED, SHEET: AUTO, MAGNIFICATION:100%, FINISH: NONE | |

| DISPLAY ORDER | JOB TYPE | SETTINGS | NUMBER OF TIMES OF USE |
|---|---|---|---|
| 1 | COPY | NUMBER OF SETS:1, COLOR SELECTION: COLOR, DOUBLE/SINGLE-SIDED SETTING: SINGLE-SIDED, SHEET: AUTO, MAGNIFICATION: 100%, FINISH: NONE | 50 |
| 2 | COPY | NUMBER OF SETS:1, COLOR SELECTION: MONOCHROME, DOUBLE/SINGLE-SIDED SETTING: SINGLE-SIDED, SHEET: AUTO, MAGNIFICATION: 100%, FINISH: NONE | 35 |
| 3 | FAX | DESTINATION:0441112345, READING SIZE: AUTO, RESOLUTION 200×100, MAGNIFICATION:100% | 32 |
| 4 | FAX | DESTINATION:0441112244, READING SIZE: AUTO, RESOLUTION 200×200, MAGNIFICATION:100% | 30 |
| 5 | Email | DESTINATION:tanaka@canon.co.jp, READING SIZE: AUTO, RESOLUTION 300×300, MAGNIFICATION:100% | 28 |
| 6 | COPY | NUMBER OF SETS:1, COLOR SELECTION: MONOCHROME, DOUBLE/SINGLE-SIDED SETTING: DOUBLE-SIDED, SHEET: AUTO, MAGNIFICATION: 100%, FINISH: NONE | 25 |
| 7 | FAX | DESTINATION:0441112255, READING SIZE: AUTO, RESOLUTION 200×200, MAGNIFICATION:100% | 23 |
| 8 | COPY | NUMBER OF SETS:1, COLOR SELECTION: AUTO, DOUBLE/SINGLE-SIDED SETTING: SINGLE-SIDED, SHEET: AUTO, MAGNIFICATION: 100%, FINISH: STAPLING | 20 |
| 9 | FAX | DESTINATION:0441112266, READING SIZE: AUTO, RESOLUTION 200×200, MAGNIFICATION:100% | 18 |
| ... | ... | ... | ... |

*FIG. 6*

IMAGE PROCESSING APPARATUS THAT CONTROLS DISPLAY OF OBJECT, METHOD OF CONTROLLING THE SAME, AND STORAGE MEDIUM

BACKGROUND OF THE INVENTION

Field of the Invention

The present invention relates to an image processing apparatus that controls display of an object, and a method of controlling the same, and a storage medium.

Description of the Related Art

There is known an image processing apparatus that is equipped with a display device having a touch-panel type operation screen and displays an application button for executing a predetermined job on a home screen displayed on the operation screen. Further, there is known an image processing apparatus that displays an application button holding settings of a job on an operation screen, and executes, when the application button is pressed, the job while reflecting the settings on the execution of the job.

Examples of such an image processing apparatuses include a so-called multifunction peripheral (MFP), and a variety of proposals have been provided with respect to the display control of the application button. For example, Japanese Laid-Open Patent Publication (Kokai) No. 2011-234170 has proposed a technique for preventing a transmission error by displaying only a button of a transmission protocol permitted by a user and not displaying a button of a transmission protocol inhibited by the user. Further, Japanese Laid-Open Patent Publication (Kokai) No. 2013-145946 has proposed a technique for reducing an operation load of a user by displaying application buttons in an order of use frequency from the highest.

For example, when an application button including a transmission destination (destination) by facsimile transmission (hereinafter referred to as the "FAX") is selected and transmission of image data is executed, an error sometimes occurs (transmission is not normally completed) depending on a line condition or a state and settings of a device on a receiving side. As an example, when transmission with an F code and a password is performed for confidential transmission, if the F code and the password do not match, the transmission results in a communication error, and the job is terminated. At this time, in a case where the setting of the F code and the password has been deleted or changed on the receiving side, even when retransmission is performed after that, the retransmission similarly results in a communication error, and the job is terminated. Thus, in a case where the confidential transmission job is repeated in a state where a user on a transmitting side does not notice the communication error, this job is recognized as a job which is high in use frequency, and an application button for executing this job is displayed in a higher rank.

Further, when FAX transmission is performed, this transmission is sometimes terminated with an error caused by a use state of a device on a receiving side or a line condition. For example, in a case where the line is busy because the device of the receiving side is being used for telephone conversation or FAX communication with another partner, the device on the transmitting side cannot connect to the device on the receiving side for communication, and hence the device on the transmitting side determines that the line is busy and terminates the transmission as an error. However, in this case, the line busy state of the device on the receiving side is often terminated after the lapse of some time. Therefore, in most cases, FAX transmission can be normally performed by performing retransmission when a certain time period elapses after FAX transmission has been terminated due to the error. In such a case, there is no problem even when the executed job is recognized as a job high in use frequency and the application button for executing this job is displayed in a higher rank.

SUMMARY OF THE INVENTION

The present invention provides an image processing apparatus that is capable of preventing the display priority of an application button displayed on a home screen from being raised to a higher rank due to repeat of error termination, a method of controlling the same, and a storage medium.

In a first aspect of the present invention, there is provided a image processing apparatus including a display device that displays a plurality of objects each having settings set therefor, in an order of the number of times of use of each object, a user interface that selects one object of the plurality of objects, and a controller that executes, after the one object is selected by the user interface, a job based on settings set in association with the selected one object, wherein when execution of the job by the controller is not normally completed, the number of times of use of the object selected by the user interface is not increased.

In a second aspect of the present invention, there is provided a method of controlling an image processing apparatus including a display device, including displaying a plurality of objects each having settings set therefor, in an order of the number of times of use of each object, receiving selection of one object of the plurality of objects, and executing, after the one object is selected, a job based on settings set in association with the selected one object, wherein when execution of the job by the controller is not normally completed, the number of times of use of the selected object.

According to the present invention, it is possible to prevent the display priority of an application button displayed on a home screen from being raised to a higher rank due to repeat of error termination.

Further features of the present invention will become apparent from the following description of exemplary embodiments (with reference to the attached drawings).

BRIEF DESCRIPTION OF THE DRAWINGS

FIG. 4 is a diagram showing history data of executed jobs.

DESCRIPTION OF THE EMBODIMENTS

The present invention will now be described in detail below with reference to the accompanying drawings showing embodiments thereof.

Figure 1:
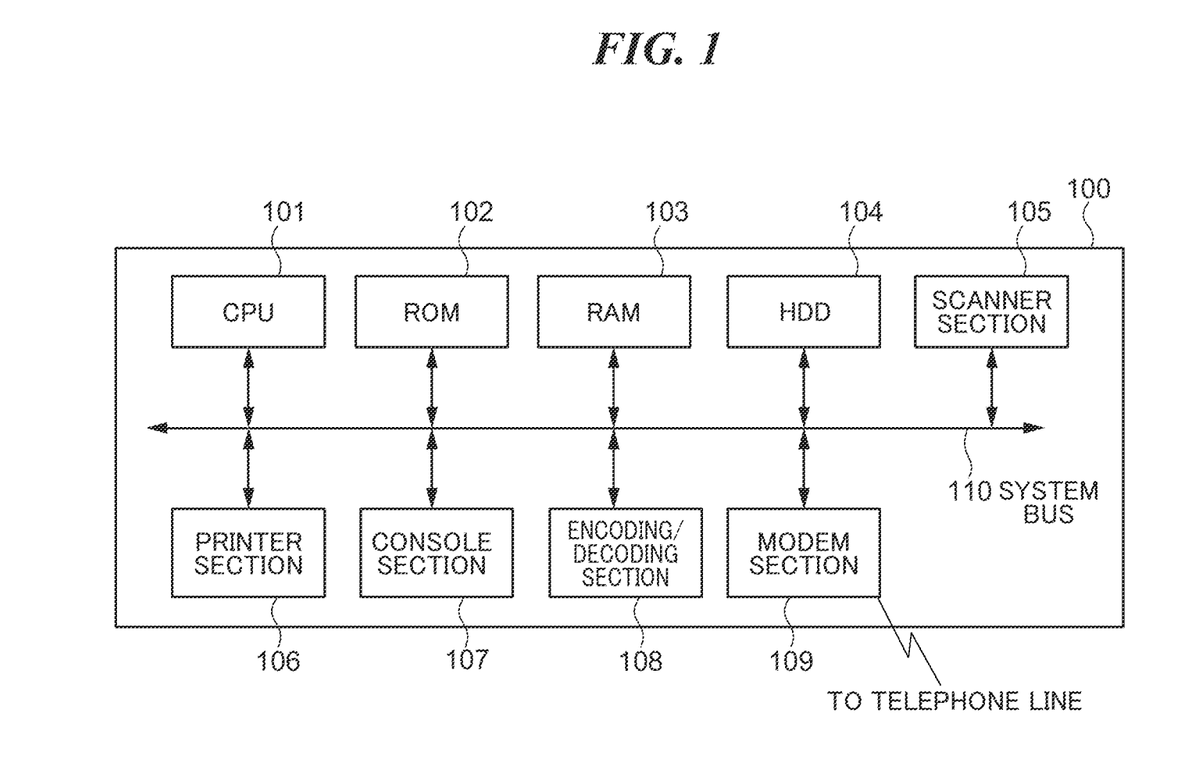
FIG. 1 is a schematic block diagram of an image processing apparatus according to an embodiment.

Hereafter, an embodiment of the present invention will be described in detail with reference to the accompanying drawings. FIG. 1 is a block diagram showing a hardware configuration of an image processing apparatus 100 according to an embodiment of the present invention. The image processing apparatus 100 includes a CPU 101, a ROM 102, a RAM 103, an HDD 104, a scanner section 105, a printer section 106, a console section 107, an encoding/decoding section 108, and a modem section 109, and these components are communicably connected via a system bus 110.

The CPU 101 controls the overall operation of the image processing apparatus 100 by loading control programs stored in the ROM 102 or the HDD 104 into the RAM 103 and executing the loaded programs. The ROM 102 stores the control programs which can be executed by the CPU 101 and so forth. The RAM 103 mainly functions as a main memory and a work area, for the CPU 101. The HDD 104 is one of storage devices, and stores a boot program, a variety of application programs, font data, a user file, and edited file, and so forth. Note that a flash memory, an SDD, or the like may be used in place of or in addition to the HDD 104.

The scanner section 105 optically reads an original set on an original platen glass in a designated mode (defined e.g. by the settings of a sheet size, a color, a resolution, a density, and so forth) and generates image data. The printer section 106 prints an image on a sheet based on predetermined image data and delivers the printed sheet to a sheet discharge tray or the like. The scanner section 105 and the printer section 106 are controlled by the CPU 101.

The console section 107 includes hard keys and a touch panel operation section. The touch panel operation section is a display device formed by superposing a touch panel on a display, such as a liquid crystal panel, and enables predetermined processing to be executed by a touch operation performed on a screen displayed on the display. A user can make a variety of settings for the image processing apparatus 100 by operating the hard keys and the touch panel operation section. Note that on the display forming the touch panel operation section, a variety of settings and an operating status of the image processing apparatus 100 can be displayed.

The encoding/decoding section 108 encodes and compresses image data to be transmitted to the outside via the modem section 109, and decodes compressed data received from the outside to restore the data to original image data. The modem section 109 is connected to a telephone line (PSTN line), for transmitting image data generated by the scanner section 105 to an outside transmission destination (destination) via the telephone line by FAX, and inversely, receiving image data from outside by FAX. Note that as an example of the image processing apparatus 100 configured as descried above, there may be mentioned a multifunction peripheral (MFP).

Figure 2:
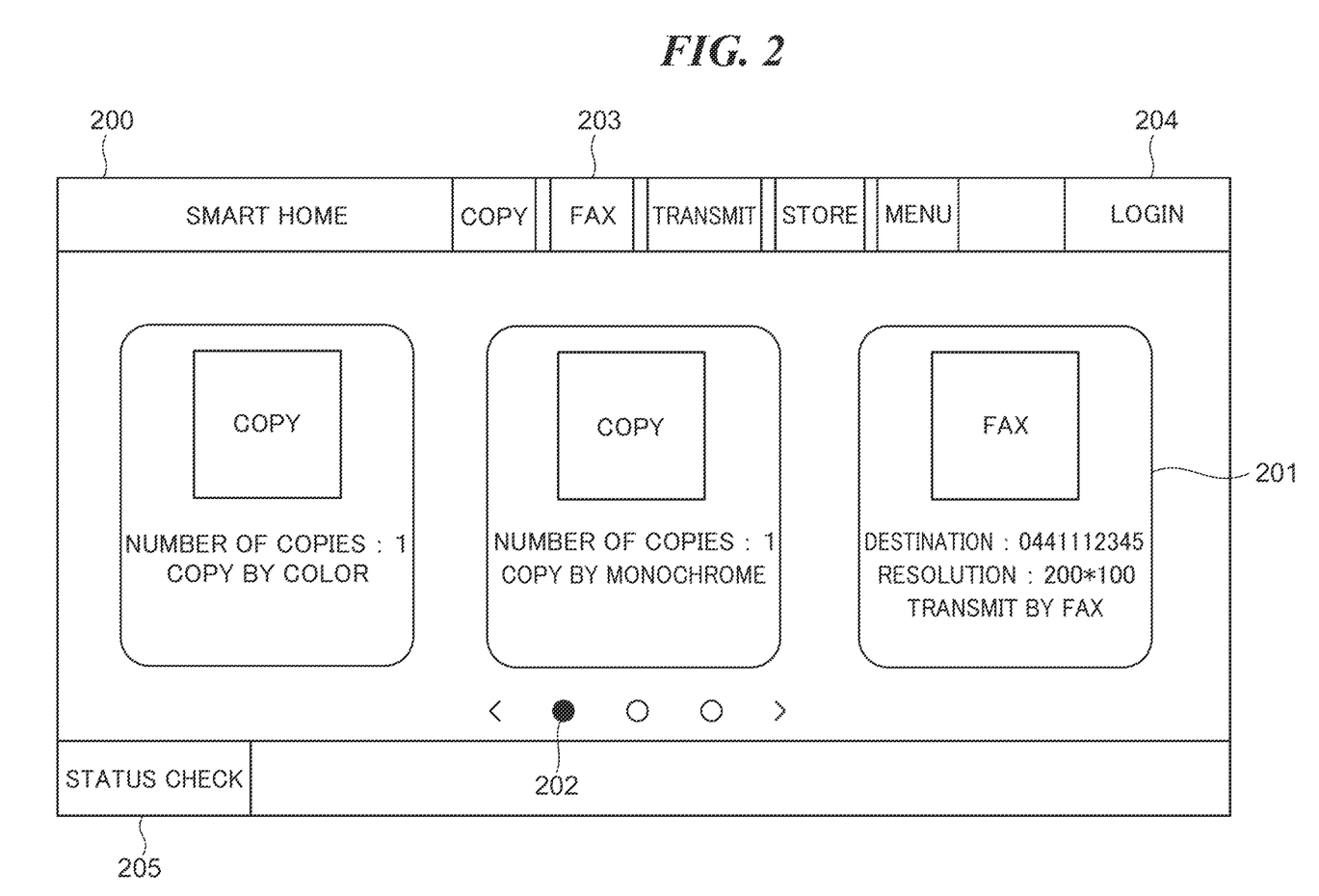
FIG. 2 is a diagram showing an example of a home screen displayed on a display of a console section.

FIG. 2 is a diagram showing an example of a home screen 200 displayed on the display of the console section 107. The home screen 200 displays a plurality of application buttons 201 each including settings set when a job is executed. One or a plurality of settings are given to each application button 201, and when one of the application buttons 201 is pressed, a job is executed with settings associated with the pressed application button 201. As the application buttons 201, FIG. 2 shows a button for generating one set of color copies, a button for generating one set of monochrome copies, and a button for performing FAX transmission to a predetermined destination (phone number: 0441112345) at a resolution of 200×100.

The home screen 200 displays switching buttons 202 for switching an application button-displaying screen. When one of the switching buttons 202 is pressed, or the home screen 200 is flicked, or a "<" button or a ">" button displayed on left and right sides of the switching buttons 202 is pressed, the preceding screen, if any, or the following screen (neither of which is shown) of the application button-displaying screen can be displayed. In the present example, the application button-displaying screen has three screens, and FIG. 2 shows the first screen (the application button-displaying screen which is the highest in the display priority) of the application button-displaying screens.

The home screen 200 displays function selection buttons 203 for selecting a variety of functions which can be executed by the image processing apparatus 100 and shifting the screen to an operation screen for executing the selected function. For example, when "FAX" is pressed, the home screen 200 is shifted to a screen (not shown) for setting an original reading resolution, color (monochrome/gray/color), and a destination.

The home screen 200 displays a login button 204 that is pressed by a user when the user logs in. The user can perform user authentication by inputting an ID and a password on a login screen (not shown) displayed by pressing the login button 204. On the home screen 200, a status check button 205 is displayed, and the user can confirm a status of a job and an execution history by pressing the status check button 205 to display a status checking screen (not shown).

Figure 3:
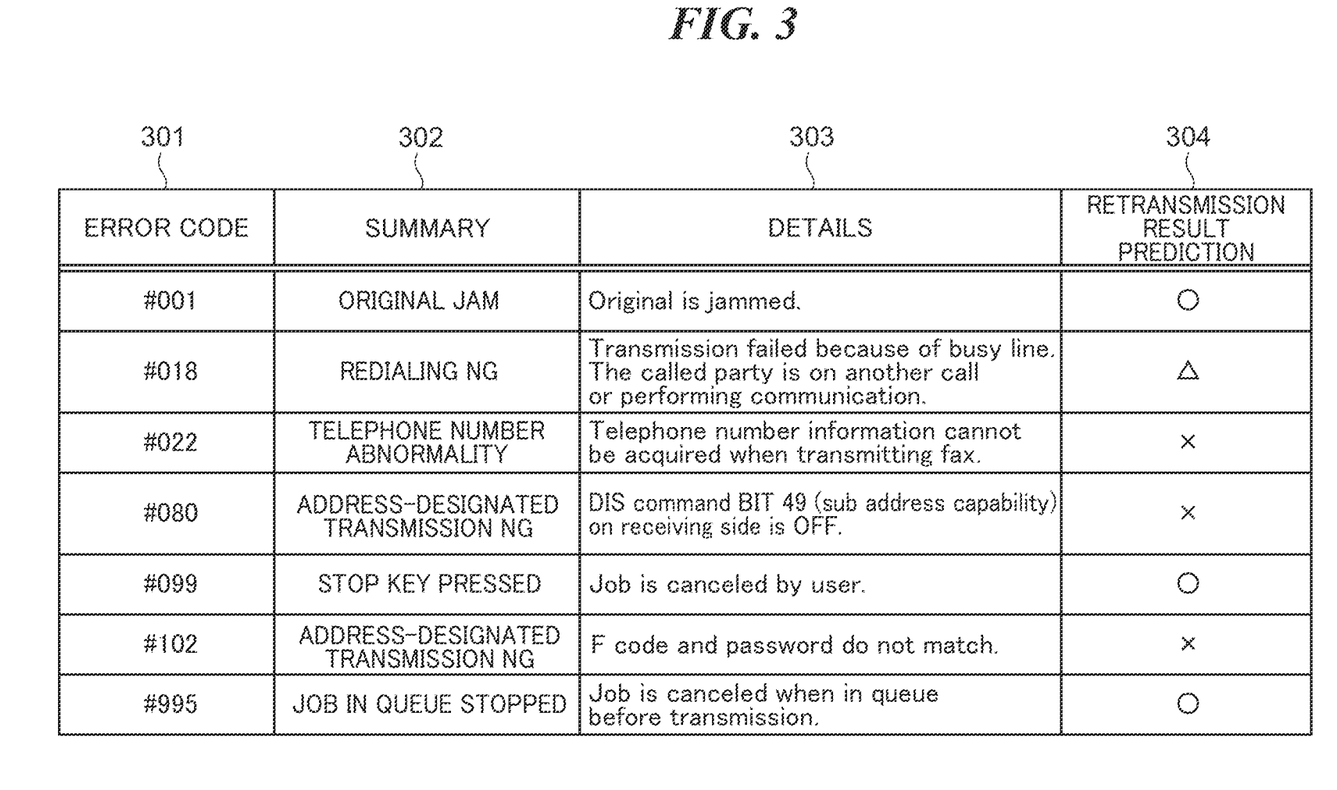
FIG. 3 is a diagram showing a list of error codes of errors that occur in FAX transmission.

FIG. 3 is a diagram showing a list of error codes of errors that occur in FAX transmission. The error code list shown in FIG. 3 is stored in the HDD 104. To each error generated in FAX transmission, an error code 301 associated with the contents of the error is assigned.

In a case where FAX transmission fails, the error code 301 indicating the cause of the failure is displayed on the display of the console section 107, and further, stored as history data of the job, described hereinafter with reference to FIG. 4. The user of the image processing apparatus 100 can know details of the generated error by confirming the error code 301 displayed on the display of the console section 107.

The error code list includes explanation about a summary 302 and details 303 of the generated error for each error code 301. Further, the error code list includes a retransmission result prediction 304. The retransmission result prediction 304 refers to information predicting whether or not, when retransmission is executed, it is possible to normally execute transmission. A mark "o" in the retransmission result prediction 304 indicates that there is a high possibility that when retransmission is executed, transmission is normally completed. A mark "Δ" in the retransmission result prediction 304 indicates that there is a possibility that when retransmission is executed, transmission is normally completed. A mark "x" in the retransmission result prediction 304 indicates that there is a high possibility that even when retransmission is executed, an error occurs again.

For example, an error indicated by an error code 301 of #001 indicates that transmission failed because paper jam occurred during scanning of an original when FAX transmission was executed. In such a case, the error was not caused due to a line or a device of a transmission destination, and the user generally resets the original, and hence the user can normally perform FAX transmission by scanning the original without causing paper jam for retransmission. Therefore, the mark "o" is set in the retransmission result prediction 304 of the error code 301 of #001.

An error indicated by an error code 301 of #018 indicates that transmission failed because the line was busy, i.e. a receiving device of the transmission destination was being used for communication or telephone conversation with another partner, at the time of FAX transmission. In such a case, there is a possibility that FAX transmission can be normally performed by performing retransmission after the lapse of a predetermined time period. Therefore, the mark "Δ" is set in the retransmission result prediction 304 of the error code 301 of #018.

An error indicated by an error code 301 of #102 indicates that transmission failed because, when FAX transmission was performed by designating an F code and a password, the designated F cord and password did not match an F code and a password set in the receiving side. In such a case, even when retransmission is performed by designating the same F code and password, the retransmission is terminated with an error, and hence the mark "x" is set in the retransmission result prediction 304 of an error code 301 of #102.

As described above, depending on the error code 301 indicated at the time of FAX transmission, FAX retransmission is expected to be normally completed or terminated with an error again. In a case where a job is actually executed e.g. by pressing the predetermined application button 201, and an error occurs as a result of execution of the job, an error code 301 and a retransmission result prediction 304 associated therewith are stored in the RAM 103 or the HDD 104 in association with information on the executed job.

For example, an error code list similar to that shown in FIG. 3 is also prepared with respect to errors which can occur when E-mail transmission is performed, and a result prediction of re-execution of the job (re-execution result prediction: o, Δ, or x) is defined according to the contents of each error code. An error code list is similarly prepared with respect to errors associated with copying. However, the errors that occur in copying are malfunctions caused inside the image processing apparatus 100, and for example, in most cases, the errors are shortage of consumables, such as toner, running-out of paper in a sheet feeding tray, and a mechanical or electrical malfunction. These are errors which are eliminated by an operation performed by a user or technical expert for fixing them, and hence the re-execution result prediction is determined as "o" for many of the errors.

FIG. 4 is a diagram showing history data of executed jobs. In the present embodiment, it is possible to register 1000 items of history data at the maximum, and when the number of registered history data items exceeds 1000, older history data items are sequentially overwritten by newer history data items, and the 1001-st history data item is registered by overwriting the first history data item. With this, it is possible to always register the latest 1000 history data items.

The history data is stored in the HDD 104. Then, the history data is updated when an executed job is terminated, as will be described hereinafter with reference to FIG. 6 (steps S602 to S603). However, this is not limitative, but the history data may be updated when a user presses the application button 201 displayed on the home screen 200 or when the user presses a start key (not shown) after conditions (settings) of a job are determined via the console section 107. In this case, if the job is terminated with an error, an error code associated with the error is added and stored.

When a job is executed, an item number (No.) 401 is assigned to the job, and a generation date 402 of the job, a job type 403, and settings 404 are stored in association with the item number 401. Further, in a case where a job is terminated with an error, an error code 405 is stored. Note that in a case where a job is normally completed, the column of the error code 405 is empty.

The generation date 402 indicates a date of generation of a job (date of execution of the job), and when a job is executed, the job is stored with the item number 401 set to "1". Therefore, the item number 401 of each of history data items of jobs executed before is shifted down. More specifically, the item numbers 401 are sequentially changed such that the item number 401 of a job having its item number 401 set to "1" is changed to "2", the item number 401 of a job having its item number 401 set to "2" is changed to "3", and so on, and the history data item of a job having its item number 401 set to "1000" is deleted.

The job type 403 indicates a variety of jobs, such as copy, FAX, and E-mail, which can be executed by the image processing apparatus 100. In the settings 404, all settings set when a job is executed are stored with respect to a variety of items which can be set, but FIG. 4 shows only typical items for convenience. Note that only settings which are changed from default values thereof by a user may be stored in the settings 404, and in this case, the user can know all settings by referring to the default settings.

Figure 5:
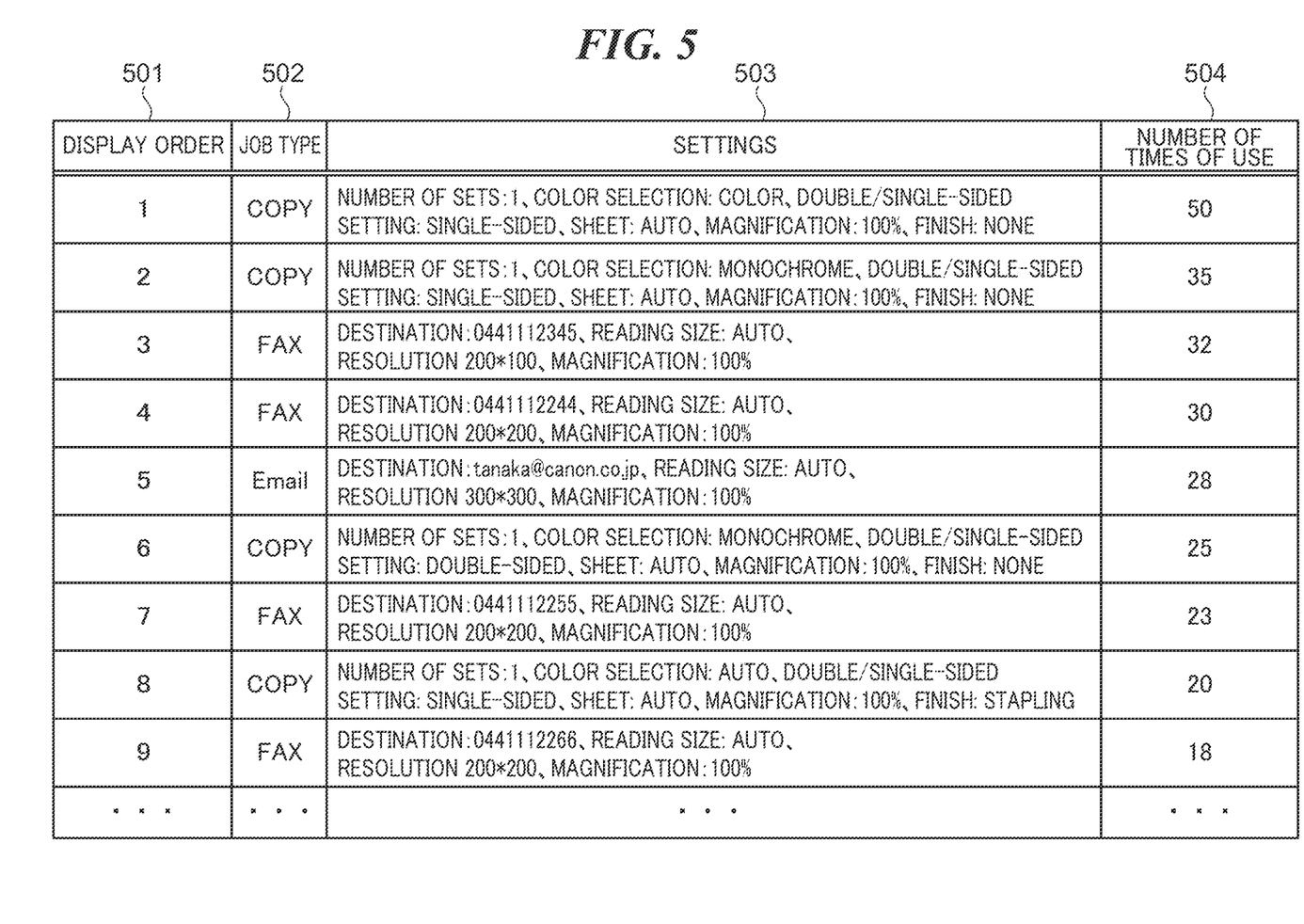
FIG. 5 is a diagram showing application button display data.

FIG. 5 is a diagram showing application button display data generated to determine the display priority for displaying the application buttons 201 on the home screen 200. The application button display data is generated and updated according to a process, described hereinafter with reference to FIG. 6, based on the history data shown in FIG. 4, and is stored in the HDD 104. On the home screen 200, the application buttons 201 are displayed according to a display order 501 of the application button display data.

The application button display data is formed by the display order 501, a job type 502, settings 503, and a number of times of use 504. The display order 501 indicates a descending order of the number of times of use 504 from the largest, and the application buttons 201 are displayed on the home screen 200 in the order of the number of the display order 501. More specifically, the application buttons 201 for executing jobs having values of 1 to 3 of the display order 501 by using the associated settings 503 are displayed on the home screen 200 shown in FIG. 2. Similarly, although not shown, the second screen of the application button-displaying screen displays application buttons for executing jobs having values of 4 to 6 of the display order 501 by using the associated settings 503. Further, the third screen of the application button-displaying screen displays application buttons for executing jobs having values of 7 to 9 of the display order 501 by using the associated settings 503.

Figure 6:
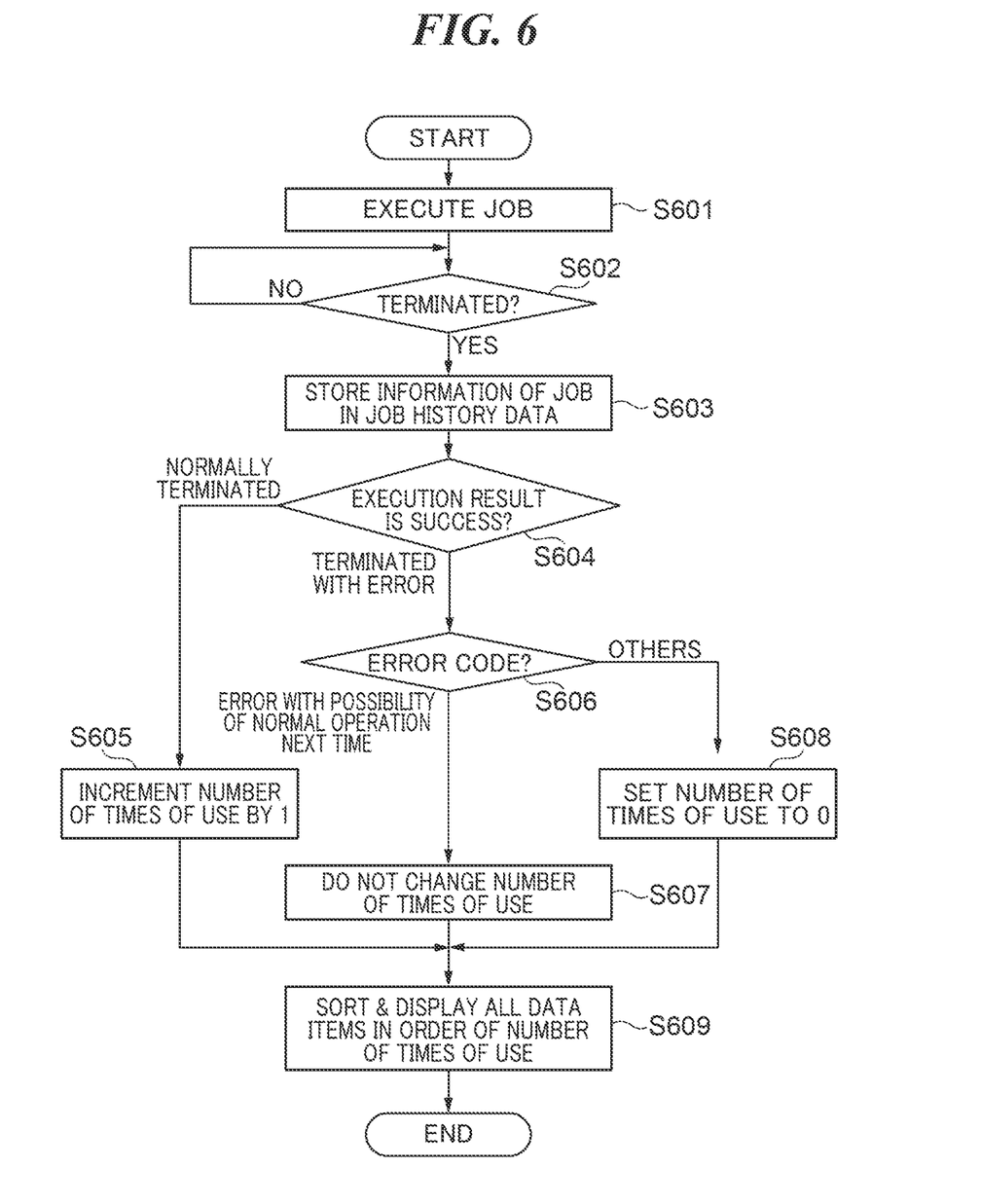
FIG. 6 is a flowchart of a process for determining the display priority of an application button.

FIG. 6 is the flowchart of the process for determining the display priority of the application button 201 to be displayed on the home screen 200. Processing operations (steps) indicated by S number in the process in FIG. 6 are realized by the CPU 101 that loads a predetermined program stored in the ROM 102 or the HDD 104 into the RAM 103 and controls the operations of the components of the image processing apparatus 100.

Although the processing operations (steps) indicated by S number are performed with respect to all jobs that can be executed by the image processing apparatus 100, here, as an example of the job, FAX transmission is described, and additional description will be given of each processing operation on an as-needed basis. By arranging results obtained with respect to all jobs in a descending order of the number of times of use from the largest, the application button display data shown in FIG. 5 can be obtained.

In a step S601, the CPU 101 executes a job using settings set by a user. The job may be executed by pressing (selecting) the application button 201 or may be executed by generating settings which are not included in the application button 201. In the step S602, the CPU 101 determines whether or not the job executed in the step S601 has been terminated. The CPU 101 repeats the determination in the step S602 until the job is terminated (NO to the step S602), and if the job is terminated (YES to the step S602), the CPU 101 proceeds to the step S603.

In the step S603, the CPU 101 stores the information on the terminated job as an history data item in the history data (see FIG. 4), whereby the history data is updated. In a step S604, the CPU 101 determines whether the execution result of the job indicates that the job has been normally completed or terminated with an error. If it is determined that the job has been normally completed, the CPU 101 proceeds to a step S605, whereas if the job has been terminated with an error, the CPU 101 proceeds to a step S606. Note that if the job has been terminated with an error, the CPU 101 acquires an error code from the history data.

In the step S605, the CPU 101 checks whether or not settings matching the settings of the history data item stored in the step S603 are included in the application button display data shown in FIG. 5. As a result, if matching data exists, the CPU 101 adds "1" to the number of times of use 504 in the job matched in settings in the application button display data. On the other hand, if no matching data exists, the CPU 101 adds the history data item stored in the step S603 to the last of the application button display data and sets the number of times of use 504 thereof to"1". Thus, in a case where a job is executed with the same settings as those of a job executed in the past, and the job is normally completed, the process proceeds in a direction of increasing the display priority for displaying the application button 201 for executing the corresponding job with the above-mentioned settings on the home screen 200.

In the step S606, the CPU 101 searches the error code list for an error code matching the error code acquired in the step S604 and acquires the information on the retransmission result prediction 304 of the retrieved error code. For example, in a case where FAX transmission has been terminated with an error, the retransmission result prediction 304 set for the error code of the occurred error is read out from the error code list of FAX transmission, shown in FIG. 3. As described above, the re-execution result prediction includes information on whether or not the job is to be normally completed in a case where retransmission is performed with the same settings. So, in the step S606, the CPU 101 further branches the process based on the re-execution result prediction.

If it is determined that the re-execution result prediction is "o" or "Δ", the CPU 101 proceeds to a step S607, whereas if it is determined that the re-execution result prediction is "x", the CPU 101 proceeds to a step S608. Note that although in this step, the process is branched to a case where there is a possibility that the job is to be normally completed when re-executing the job (case of "o" or "Δ") and a case where there is almost no possibility (case of "x"), the process may be configured to proceed to the step S608 in the case where the re-execution result prediction indicates "Δ" as well.

The step S607 is processing which is executed, in a case where the job is e.g. FAX transmission, when the job is terminated with an error of an error code having a high possibility that the job is to be normally completed when retransmission is performed. In this case, in the step S607, the CPU 101 does not change the number of times of use 504 of the application button display data for the job terminated with an error. That is, in a case where the process proceeds to the step S607, even when the same settings as the settings of the job terminated with an error are included in the application button display data shown in FIG. 5, the value of the number of times of use 504 of the job is not changed. Further, in a case where the same settings as the settings of the job terminated with an error are not included in the application button display data shown in FIG. 5, the settings of the job terminated with an error are not added to the application button display data.

The step S608 is processing which is executed, in a case where the job is e.g. FAX transmission, when the job is terminated with an error of an error code having a high possibility that the job is to be terminated with an error again even when retransmission is performed. In the step S608, the CPU 101 checks whether or not a job having the same settings as the settings of the job terminated with an error (settings of the job added to the history data in the step S603) is included in the application button display data. As a result, if the application button display data having the same settings exists, the CPU 101 changes the number of times of use 504 of the corresponding data to zero (0). In other words, the job terminated with an error of an error code set to "x" in the re-execution result prediction is excluded from the target of the processing for determining the display priority of the application button 201. That is, the application button 201 for executing a job having settings which are low in possibility that the job is to be normally completed even when the job is re-executed is excluded from the priority display target and hidden from the home screen 200.

Note that here, by setting to zero the number of times of use 504 of the job terminated with the error of the error code set to "x" in the re-execution result prediction, the application button 201 for executing the corresponding job is excluded from the priority display target. However, this is not limitative, but for example, the process may proceed in a direction of lowering the display priority by reducing the number of times of use 504 by a predetermined value (for example, a value of 1 or a value of a natural number not smaller than 2).

When the step S605, S607, or S608 is completed, a step S609 is executed. In the step S609, the CPU 101 arranges (sorts) the application button display data items in a descending order of the number of times of use 504 from the largest and displays the application buttons 201 on the home screen 200 in the order of the number of times of use 504 from the highest rank, followed by terminating the present process.

The above-described steps S601 to S608 are similarly performed with respect to a job other than FAX transmission. Therefore, in the step S609, the application button display data in which all jobs executed by the image processing apparatus 100 are re-arranged in the order of the number of times of use 504 from the highest rank is generated. Note that in a case where there are jobs which are the same in the value of the number of times of use 504 but are different in settings, the higher display priority may be given to the application button of a job executed most recently.

As described above, according to the above-described embodiment, it is possible to increase the display priority of the application button 201 for executing a job which has been normally completed. Further, as for a job terminated with an error, in a case where the error code of the error is an error code having a possibility that the job is to be normally completed if the job is executed again, it is possible to leave the application button 201 for executing the corresponding job as the priority display target. Further, in a case where the error code is an error code having a high possibility that the job is to be terminated with an error again even if the job is executed again, it is possible to exclude the application button 201 for executing the corresponding job from the priority display target. Thus, the application button 201 for executing a job which is high in use frequency and has a high possibility that the job is to be normally completed is displayed on the home screen 200, which makes it possible to increase the operability.

The present invention has been described heretofore based on the embodiments thereof. However, the present invention is not limited to these embodiments, but it is to be understood that the invention includes a variety of forms within the scope of the gist of the present invention. Further, the embodiments of the present invention are described only by way of example, and it is possible to combine the embodiments on an as-needed basis.

For example, in the above-described embodiment, the display priority of the application button 201 is determined in the descending order of the number of times of use 504 from the largest and also by considering the contents of an error code (re-execution result prediction). However, this is not limitative, but the display priority of the application button 201 may be determined in an order of the execution time of a job from the latest (giving the priority to a job executed most recently) and also according to the contents of the error code. In this case, an application button for executing a job terminated with an error is not displayed on the home screen.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-041558, filed Mar. 15, 2021, which is hereby incorporated by reference herein in its entirety.

What is claimed is:

1. An image processing apparatus comprising:
   a display device that displays a plurality of objects each having settings set therefor, in an order of the number of times of use of each object;
   a user interface that selects one object from among the plurality of objects; and
   a controller that:
      executes, after the one object is selected by the user interface, a job based on settings set in association with the selected one object;
      sets the number of times of use of the object selected by the user interface to zero or reduce the number of times of use of the object selected by the user interface by a predetermined value, in a case of a high possibility that the job will be not normally completed upon executing the job again after executing the job that is not normally completed; and
      not change the number of times of use of the object selected by the user interface in a case of a possibility that the job will be normally completed upon executing the job again after the execution of the job that is not normally completed.

2. The image processing apparatus according to claim 1, wherein the display device does not display the object having the number of times of use thereof set to zero.

3. The image processing apparatus according to claim 1, wherein, in a state where two or more objects have the same number of times of use thereof, the display device displays one of the two or more objects, which is associated with a job executed at a more recent time, with a higher priority.

4. A method of controlling an image processing apparatus including a display device, the method comprising:
   displaying a plurality of objects each having settings set therefor, in an order of the number of times of use of each object;
   receiving selection of one object from among the plurality of objects;
   executing, after the one object is selected, a job based on settings set in association with the selected one object;
   setting the number of times of use of the selected object to zero or reduce the number of times of use of the object selected by the user interface by a predetermined value, in a case of a high possibility that the job will be not normally completed upon executing the job again after executing the job that is not normally completed; and
   not change the number of times of use of the object selected by the user interface in a case of a possibility that the job will be normally completed upon executing the job again after the execution of the job that is not normally completed.

5. A non-transitory computer-readable storage medium storing a program executable by a computer to execute a method of controlling an image processing apparatus including a display device, the method comprising:
   displaying a plurality of objects each having settings set therefor, in an order of the number of times of use of each object;
   receiving selection of one object from among the plurality of objects;

executing, after the one object is selected, a job based on settings set in association with the selected one object;

setting the number of times of use of the selected object to zero or reduce the number of times of use of the object selected by the user interface by a predetermined value, in a case of a high possibility that the job will be not normally completed upon executing the job again after executing the job that is not normally completed; and not change the number of times of use of the object selected by the user interface in a case of a possibility that the job will be normally completed upon executing the job again after the execution of the job that is not normally completed.

* * * * *